Patented Jan. 19, 1937

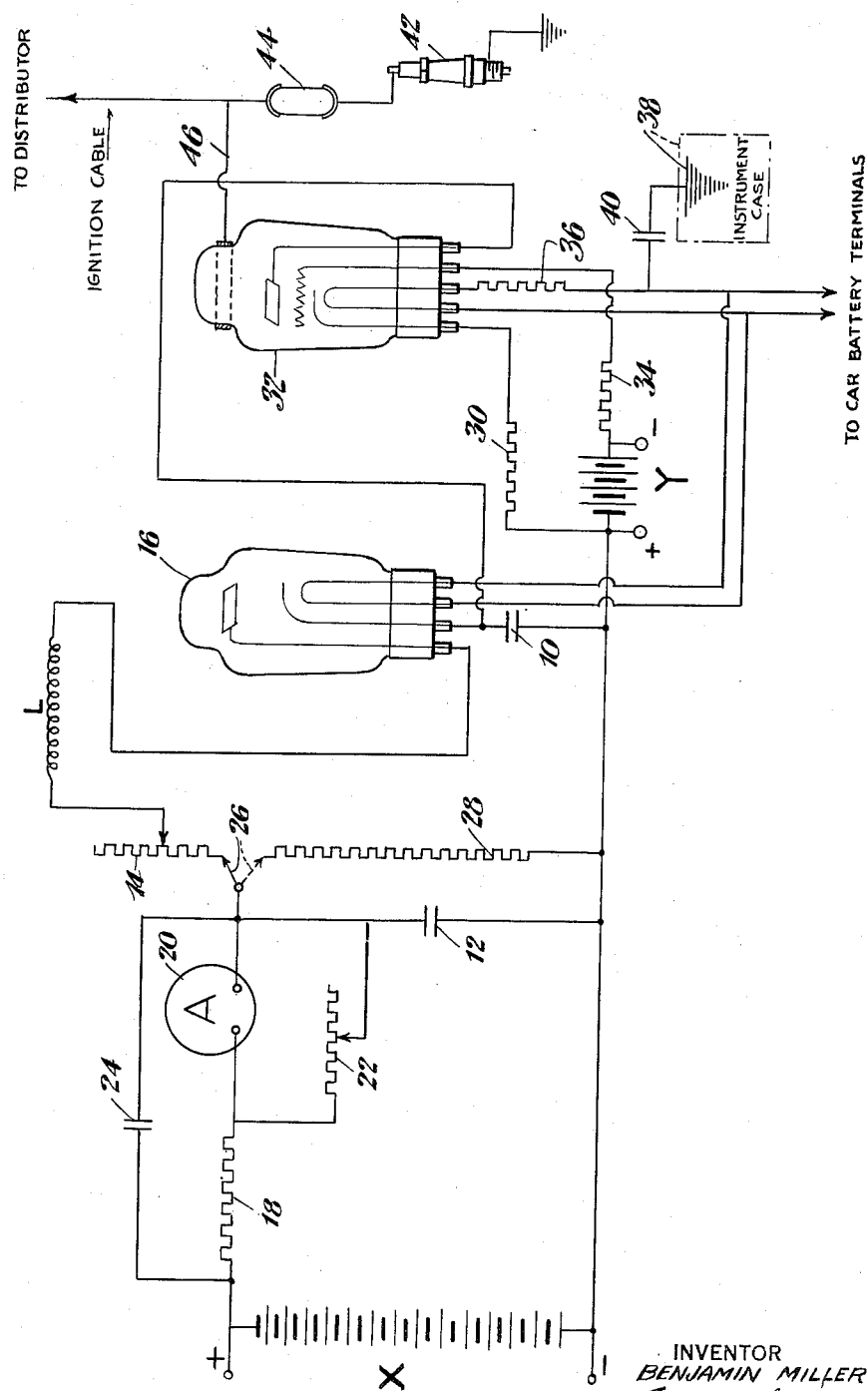

2,068,147

UNITED STATES PATENT OFFICE 2,068,147

ELECTRIC RATE METER

Benjamin Miller, Brooklyn, N. Y., assignor to Doherty Research Company, New York, N. Y., a corporation of Delaware Application July 19, 1935, Serial No. 32,213

5 Claims. (Cl. 175—183)

This invention relates generally to electric rate meters; and the primary object is to provide improved apparatus adapted for measuring the speed of a variable speed spark ignition engine. The invention herein described is an improvement on that described in my copending application Serial No. 709,901, filed February 5, 1934, for Electric flash producing method and apparatus.

One rate meter which is described in my aforementioned application Serial No. 709,901 as adapted for measuring the speed of a spark ignition engine comprises essentially an electric condenser, a trigger tube through which the condenser may be discharged, an oscillating circuit for charging the condenser, a conductor positioned near the cathode of the trigger tube and connected to the ignition circuit of the engine so that the ignition impulses of the engine may serve as stimuli to initiate discharge of the condenser through the trigger tube, and an ammeter connected in series circuit with the condenser for measuring the current flowing through the trigger tube. Since the trigger tube is rendered conductive by each ignition impulse delivered to that spark plug of the engine to which it is operatively connected, and since the number of ignition impulses is directly proportional to the speed at which the engine is driven, the ammeter may be calibrated to indicate the speed of the engine. The term "trigger tube" designates a gaseous conductor device in which conduction of current through a gaseous medium between two primary electrodes is initiated by applying the proper stimulus, as for example by changing the potential of a third electrode.

Another object of the invention is to provide apparatus of the type referred to which is more economical to build and more reliable in service than that described in my aforementioned application, Serial No. 709,901.

With the above and other objects and features in view the invention consists in the improved speed indicating apparatus which is hereinafter described and particularly defined in the accompanying claims.

The invention will be hereinafter more particularly described by reference to the accompanying drawing, which is a wiring diagram of a condenser discharge trigger tube rate meter having an oscillating condenser charging circuit including an electric check valve, and also having an ammeter for measuring current flowing through the trigger tube, together with variable resistances the purpose of which will be hereinafter more fully described.

The oscillating condenser charging circuit which is illustrated in the drawing embodies a condenser 10 which may be a 0.5 microfarad condenser charged from a reservoir condenser 12 which is in turn charged from a source X which may be a 112½ volt battery. The condenser charging circuit includes an inductance L which may be of 10 henries, and a variable resistance 14 which may have a maximum value of 5000 ohms. The charging circuit of condenser 10 also includes an electric check valve 16 in the form of a hot cathode rectifier tube preferably of the type 1—v.

The charging circuit for reservoir condenser 12 includes the source of charging current "X", a fixed resistance 18 which may have a value of 1500 ohms, and a meter 20 which may have a full scale reading of 1 milliampere. Meter 20 is shunted by a variable resistance 22 which may have a maximum resistance of 3000 ohms when the meter resistance is about 30 ohms. A condenser 24 is shunted across the meter and resistance 18. This condenser may have a capacity of 1500 microfarads. A switch 26 may be used to break the charging circuit of condenser 10 while connecting a fixed resistance 28 (which may be 82,400 ohms) across reservoir condenser 12.

The discharge circuit of condenser 10 includes a fixed resistor 30 which may be 500 ohms, and a trigger tube 32 which may be a type 885 hot cathode argon filled grid controlled rectifier. The grid of tube 32 is normally maintained negative with respect to its cathode by battery Y of 67½ volts. Battery Y is connected to the grid through a resistance 34 which may have a value of 150,000 ohms.

The cathode heaters of tubes 16 and 32 are normally energized by the 6 volt battery which supplies the ignition system for the spark ignition engine the speed of which is to be determined. Resistor 36 (of 2½ ohms resistance when tube 32 has a 2½ volt, 1.4 ampere heater) is interposed in the cathode heater circuit of tube 32 in order to operate the 2½ volt heater from a 6 volt battery.

The metal case 38 of the rate meter (only a small portion of which is shown) is connected to the cathode heater circuit through a condenser 40 which may have a capacity of .01 microfarad.

Between the high tension terminal of a spark plug 42 mounted in one cylinder of the engine, and a distributor (not shown) there is connected a neon lamp 44. From the distributor side of the neon lamp a conductor 46 leads to the trigger tube 32.

Current flowing in a condenser discharge rate meter is given by the following formula:

$$I = NE_cC \quad \text{(Equation No. 1.)}$$

in which "I" equals the number of amperes flowing; "N" equals the number of charges and discharges per second; "$E_c$" equals the number of volts change in potential of condenser between discharged and charged states; and "C" equals the number of farads in capacity of condenser. The meter used measures "I" but may be calibrated in terms of "N" if "$E_c$" and "C" remain constant; but when a dry battery is used as the source of potential, "$E_c$" does not remain exactly constant, since the battery voltage decreases as the battery gets older. It is therefore necessary to make a correction for the change in battery voltage, which may be done as shown in my aforementioned application Serial No. 709,901 by measuring the voltage of the battery periodically. A more convenient method has been employed in my improved rate meter. Variable resistance 22 is shunted across the ammeter 20 whereby a portion of the current may be made to bypass the ammeter. When the battery X is new and its voltage highest, a considerable portion of the current is bypassed; and as the battery ages and its voltage drops a smaller portion of the current is bypassed. Adjustment is made by the aid of a standard resistance 28. Throwing the switch 26 connects the battery X through the ammeter 20 to the standard resistance 28, and disconnects it from the rest of the indicator. The ammeter 20 should then read full scale; if it does not, the dial of the variable resistance 22 is turned until full scale reading of ammeter 20 is obtained. Then the switch 26 is thrown back disconnecting the standard resistance 28 and connecting the ammeter with the rest of the rate meter circuit. The standard resistance is so chosen that the battery X will be incapable of bringing the ammeter 20 to a full scale reading with the variable resistance 22 having its maximum value, when the cells of the battery have reached the voltage at which they should be replaced, which is 1.13.

If a condenser discharge rate meter were used of the type previously suggested, it would be necessary to employ special meters or condensers. "$E_c$" of Equation No. 1 would be equal to or slightly less than "$E_b$" the battery voltage. In order to cover a certain range of speeds, a convenient meter sensitivity would be chosen and the corresponding capacity calculated. For example, if the highest rate to be measured should be 30 per second, and if a battery is to be used of 100 volts, then $$\frac{I}{C} \text{ equals } 3000$$

If "C" were $0.5 \times 10^{-6}$, "I" would be $1.5 \times 10^{-3}$ or a meter having full scale deflection for 1½ milliamperes would be used with a half microfarad condenser. The ordinary low priced meter is adjusted to be within 2% of its nominal reading, while the ordinary low priced condenser may be within 10% of its nominal capacity. To get meters and condensers especially adjusted to give the range desired for an accurate rate meter within reasonable limits would be prohibitively costly. Condensers cannot be adjusted readily, nor can meters. It might be possible to shunt the meter to take care of the deviation, but to adjust two shunts, one to take care of changes in battery voltage and one to take care of condenser and meter deviations, would be difficult. Fortunately the preferred condenser charging circuit of the present invention may be modified to take care of this difficulty with slight expense and trouble.

In my pending application Serial No. 709,901, a condenser charging circuit is described which comprises inductance and an electric check valve. It is characteristic of an oscillating charging circuit that the condenser potential reaches a maximum value greater than the source potential. The electric check valve 16 traps the overcharge so that the condenser 10 retains this maximum potential until it is discharged. By controlling the ratio of resistance to inductance in the charging circuit, the ratio of maximum condenser potential to source potential may be controlled. The equation for a condenser discharge rate meter having this type of condenser charging circuit is $$I = kNE_bC \quad \text{(Equation No. 2.)}$$

in which "$E_b$" equals number of volts in battery potential; "k" equals function of resistance and inductance of condenser charging circuit. By adding a variable resistance 14 (see Fig. 1) to the condenser charging circuit, "k" may be varied over a range nearly 2 to 1. An ordinary ammeter 20 and condenser 10 may therefore be used to cover the desired range of speed. The calibration then consists in connecting the indicator to a source of impulses of known speed, and adjusting this second variable resistance 14 to bring the needle of ammeter 20 to that speed on the scale.

The two variable resistances 22 and 14 are entirely independent. 22 is used with the switch 26 turned to connect in the standard resistance 28 to set the ammeter for the battery voltage. Then the switch is turned to disconnect the standard resistance 28 and the indicator is connected to the standard impulse generator. It is convenient for the standard impulse generator to have a rate corresponding to full scale on the ammeter or to a scale value near full scale. For example, if the speed range is 2500 R. P. M. a standard impulse rate of two per second corresponding to 2400 R. P. M. is convenient. By moving the slide of the second variable resistance 14 the needle of ammeter 20 is brought to the standard speed. Resistance 14 is then locked until recalibration has to be made.

In this manner the R. P. M. indicator may be built of standard low cost parts, the calibration may be made in the laboratory quickly and easily, and in the field the instrument may be compensated quickly and easily for change in battery voltage.

The current flowing into the condenser 10 consists of a series of impulses which are separated by intervals of no current flow. Each discharge of condenser 10 causes a current impulse of the same kind, and the less frequent the condenser discharges the longer are the intervals between current impulses. When the intervals become very long, that is, at low discharge rates, the needle of ammeter 20 tends to vibrate. To reduce this tendency is the purpose of resistance 18 and condenser 24. Reservoir condenser 12 also assists in reducing this tendency.

The exciting circuit for trigger tube 32 includes the conductor 46 which may comprise a metal band mounted outside of the glass wall of tube 32 near the cathode. In using this instrument for measuring engine speed, when conductor 46 is connected to the center electrode of spark plug 42, it has been noticed that at low engine speeds the instrument becomes unstable in the sense that the needle of ammeter 20 occasionally swings off the scale. This instability is apparently occasioned by multiple sparks caused by the fact that at low speed and no load operation the voltage required for breaking down the spark plug gap is so low that the energy stored in the spark coil is not used up in one spark, so that a succession of sparks occurs throughout a time period longer than the time consumed in charging condenser 10. When this takes place the trigger tube cannot deionize, so that current flows continuously in the charging circuit, moving the meter needle off scale. It has been found that this instability of the meter at low engine speeds can be corrected by putting in a spark gap, or preferably a neon tube 44, in the ignition system in series between the spark plug and the distributor and connecting conductor 46 to the distributor side of the gap or neon tube.

When an ignition impulse is delivered by the ignition system of the engine to spark plug 42, conductor 46 transmits a stimulus to trigger tube 32, causing the trigger tube to become conductive. Condenser 10 then discharges through the trigger tube.

After condenser 10 has been discharged through trigger tube 32, it is recharged from reservoir condenser 12 through the oscillating charging circuit, and the condenser 10 is then ready to discharge again the next time an ignition impulse is delivered from the ignition system to the spark plug 42. The average current flowing through the tube 32 is indicated by ammeter 20. The meter reading corresponding to any ignition impulse rate, and therefore to any engine speed, may be calculated from the potential of source X and the circuit constants, but it is preferable to calibrate ammeter 20 in impulses per second or revolutions per minute by direct determination at several known rates.

The invention having been thus described, what is claimed as new is:

1. In an electric rate meter comprising a condenser, a charging circuit for the condenser comprising a source of charging current, an ammeter connected in series circuit with said condenser, and means for discharging the condenser at a frequency proportional to the rate to be measured, the improvement which comprises means for compensating for variations in potential of the source of charging current comprising a variable resistance shunted across the ammeter in the condenser charging circuit, a fixed resistance, and a switch located in position to alternatively connect the fixed resistance in closed circuit with the ammeter and source of charging current with the condenser disconnected and to connect the condenser in the charging circuit with the fixed resistance disconnected.

2. In an electric rate meter comprising a condenser, an oscillating charging circuit for the condenser comprising a source of charging current, an inductance, an electric check valve and an ammeter connected in series circuit with said condenser, and means for discharging the condenser at a frequency proportional to the rate to be measured, the improvement comprising a variable resistance connected in series with the inductance and the electric check valve in the condenser charging circuit whereby to calibrate the rate meter.

3. In an electric rate meter adapted for use in checking the speed of a spark ignition engine of the type in which a condenser is caused to discharge through a trigger tube by means of ignition impulses which are delivered to a spark plug in the ignition circuit of the engine, the improvement which comprises a series gap located in the ignition circuit between the spark plug and the point of connection of the trigger tube to the ignition circuit.

4. In an electric rate meter adapted for use in checking the speed of a spark ignition engine of the type in which a condenser is caused to discharge through a trigger tube by means of ignition impulses which are delivered to a spark plug in the ignition circuit of the engine, the improvement which comprises a neon lamp located in the ignition circuit between the spark plug and the point of connection of the trigger tube to the ignition circuit.

5. An electric rate meter circuit comprising a condenser, means for discharging the condenser at a selected rate, and an oscillating charging circuit for the condenser comprising a source of charging current, an inductance and an electric check valve connected in series circuit with said condenser, and a variable resistance connected in series with the inductance and the electric check valve whereby to control the ratio of the maximum condenser voltage to the voltage of the source.

BENJAMIN MILLER.